(12) United States Patent
Biolsi et al.

(10) Patent No.: US 10,494,936 B2
(45) Date of Patent: Dec. 3, 2019

(54) FASTENER RETENTION MECHANISM

(71) Applicant: United Technologies Corporation, Farmington, CT (US)

(72) Inventors: David Biolsi, Portland, ME (US); Kevin C. Eckland, Kennebunk, ME (US); Steven J. Feigleson, Falmouth, ME (US); Thomas Freeman, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 645 days.

(21) Appl. No.: 15/162,032

(22) Filed: May 23, 2016

(65) Prior Publication Data

US 2017/0335701 A1 Nov. 23, 2017

(51) Int. Cl.
*F01D 9/04* (2006.01)
*F01D 11/00* (2006.01)

(52) U.S. Cl.
CPC ............. *F01D 9/042* (2013.01); *F01D 9/041* (2013.01); *F01D 11/001* (2013.01); *F05D 2220/32* (2013.01); *F05D 2230/30* (2013.01); *F05D 2240/12* (2013.01); *F05D 2240/80* (2013.01); *F05D 2260/30* (2013.01); *F05D 2300/501* (2013.01); *F05D 2300/615* (2013.01); *Y02T 50/672* (2013.01); *Y02T 50/673* (2013.01)

(58) Field of Classification Search
CPC ........ F01D 9/042; F01D 9/041; F01D 11/001; F05D 2240/12; F05D 2300/615; F05D 2260/30; F05D 2220/32; F05D 2240/80; F05D 2230/30; F05D 2300/501; Y02T 50/672; Y02T 50/673
See application file for complete search history.

(56) References Cited

U.S. PATENT DOCUMENTS 3,727,660 A * 4/1973 Burge ................... F04D 29/542
411/337
4,190,397 A * 2/1980 Schilling ............... F01D 25/243
415/108

(Continued)

FOREIGN PATENT DOCUMENTS

EP 1657406 A2 5/2006
EP 2415969 A1 2/2012

(Continued)

OTHER PUBLICATIONS

Gamwell, Wayne R., "Standard, Threaded Fasteners, Torque Limits for", Nov. 1992, Rev. B, sec. 4.3b and p. 12, II. 1-3 (Year: 1992).*

(Continued)

*Primary Examiner* — Justin D Seabe
*Assistant Examiner* — Adam W Brown
(74) *Attorney, Agent, or Firm* — Cantor Colburn LLP

(57) ABSTRACT

A stator assembly having: an inner air seal carrier having a mounting body; a plurality of guide vanes secured to the mounting body via a plurality of fasteners; and a fastener retention mechanism secured to the mounting body via the plurality of fasteners. The fastener retention mechanism having: a housing defining an inner chamber; and a filler located within the inner chamber. The portions of the plurality of fasteners are encapsulated within the filler.

14 Claims, 6 Drawing Sheets

(56) References Cited

U.S. PATENT DOCUMENTS

| | | | | |
|---|---|---|---|---|
| 4,883,407 A * | 11/1989 | Touze | | F01D 5/066 |
| | | | | 415/190 |
| 4,904,156 A * | 2/1990 | Touze | | F01D 5/066 |
| | | | | 415/190 |
| 5,259,725 A * | 11/1993 | Hemmelgarn | | F01D 11/005 |
| | | | | 29/450 |
| 5,352,087 A * | 10/1994 | Antonellis | | F01D 11/001 |
| | | | | 415/115 |
| 6,409,472 B1 * | 6/2002 | McMahon | | F01D 5/3023 |
| | | | | 415/119 |
| 7,094,020 B2 * | 8/2006 | Dong | | F01D 11/001 |
| | | | | 415/112 |
| 7,249,463 B2 * | 7/2007 | Anderson | | F01D 25/243 |
| | | | | 415/112 |
| 7,614,845 B2 * | 11/2009 | Adam | | F01D 25/145 |
| | | | | 415/134 |
| 7,635,251 B2 * | 12/2009 | Duesler | | F01D 11/001 |
| | | | | 415/160 |
| 7,704,038 B2 * | 4/2010 | Ring | | F01D 25/14 |
| | | | | 415/112 |
| 7,712,268 B1 * | 5/2010 | Guthrie | | E06B 5/003 |
| | | | | 52/202 |
| 8,206,080 B2 * | 6/2012 | Howe | | F01D 5/08 |
| | | | | 415/177 |
| 8,459,941 B2 * | 6/2013 | Jasko | | F01D 9/041 |
| | | | | 415/190 |
| 8,556,561 B2 * | 10/2013 | Norton | | F01D 5/025 |
| | | | | 411/372.5 |
| 2016/0069267 A1 | 3/2016 | Philbrick et al. | | |
| 2017/0306776 A1 * | 10/2017 | Simonds | | F01D 25/243 |

FOREIGN PATENT DOCUMENTS

| | | |
|---|---|---|
| WO | 2014046965 A1 | 3/2014 |
| WO | 2014150954 A1 | 9/2014 |

OTHER PUBLICATIONS

European Search report for Application No. 17162511.4-1006/3249165; Report dated Jan. 15, 2018; Report Date: Jan. 15, 2018; 1-10 pages.

* cited by examiner

FASTENER RETENTION MECHANISM

STATEMENT REGARDING FEDERALLY
SPONSORED RESEARCH OR DEVELOPMENT

This invention was made with government support under Contract No. N00019-02-C-3003 awarded by the United States Department of the Navy and FA8626-15-D-0015-3501 awarded by the United States Department of the Air Force. The government has certain rights in the invention.

BACKGROUND

The subject matter disclosed herein generally relates to gas turbine engines and, more particularly, to retention of fasteners for securing guide vanes internal to gas turbine engines.

Some gas turbine engines may include stator assemblies having guide vanes to direct the airflow to compressor or turbine airfoils. The guide vanes are typically attached to an inner air seal carrier through various fasteners, such as for example self-locking nuts and bolts. The self-locking feature of the fasteners serves as a primary source of retention but secondary sources of retention may be incorporated for added security, such as, for example, lock wire and silicone rubber. Utilizing lock wire to secure the self-locking nut to the bolt as a secondary source of retention creates an additional source of drag in the system due to the lock wire being in the airflow path. Utilizing silicone rubber to secure the self-locking nut to the bolt as a secondary source of retention is a low drag alternative to lock wire, however the exposed rubber may erode over time due to gas turbine engine air.

Accordingly, it is desirable to provide an improved fastener retaining mechanism.

SUMMARY

According to one embodiment, a stator assembly for a gas turbine engine is provided. The stator assembly having: an inner air seal carrier having a mounting body; a plurality of guide vanes secured to the mounting body via a plurality of fasteners; and a fastener retention mechanism secured to the mounting body via the plurality of fasteners. The fastener retention mechanism having: a housing defining an inner chamber; and a filler located within the inner chamber. The portions of the plurality of fasteners are encapsulated within the filler.

In addition to one or more of the features described above, or as an alternative, further embodiments of the stator assembly may include that the housing further includes: a base configured to secure to the mounting body; and a pair of opposing side walls extending from the base and a cover portion extending between the pair of opposing side walls.

In addition to one or more of the features described above, or as an alternative, further embodiments of the stator assembly may include that the cover portion includes at least one fastener access opening.

In addition to one or more of the features described above, or as an alternative, further embodiments of the stator assembly may include that the housing includes a screen located in the inner chamber. The screen is configured to cover the at least one fastener access opening.

In addition to one or more of the features described above, or as an alternative, further embodiments of the stator assembly may include that the filler is formed from a liquid material that is converted into a solid elastically deformable material having resilient properties.

In addition to one or more of the features described above, or as an alternative, further embodiments of the stator assembly may include that the housing and the filler are configured to encapsulate the portion of at most four fasteners.

In addition to one or more of the features described above, or as an alternative, further embodiments of the stator assembly may include that the housing is configured to reduce drag of the stator assembly.

In addition to one or more of the features described above, or as an alternative, further embodiments of the stator assembly may include that the cover portion of the housing includes a first side opening and a second side opening.

According to another embodiment, a method for encasing a portion of a plurality of fasteners securing a plurality of guide vanes to a mounting body of an inner air seal carrier is provided. The method includes the steps of: securing the plurality of guide vanes to the mounting body via the plurality of fasteners; and simultaneously securing a housing of a fastener retention mechanism to the mounting body via the plurality of fasteners. The housing defining an inner chamber and wherein the portion of the fasteners are located in the inner chamber. The method also includes the step of injecting a filler into the inner chamber. The filler configured to encapsulate the portion of the fasteners.

In addition to one or more of the features described above, or as an alternative, further embodiments of the method may include that the housing further includes: a base configured to secure to the mounting body; and a pair of opposing side walls extending from the base and a cover portion extending between the pair of opposing side walls.

In addition to one or more of the features described above, or as an alternative, further embodiments of the method may include that the cover portion includes at least one fastener access opening.

In addition to one or more of the features described above, or as an alternative, further embodiments of the method may include that the housing includes a screen located in the inner chamber. The screen is configured to cover the at least one fastener access opening.

In addition to one or more of the features described above, or as an alternative, further embodiments of the method may include that the filler is formed from a liquid material that is converted into a solid elastically deformable material having resilient properties.

In addition to one or more of the features described above, or as an alternative, further embodiments of the method may include that the housing and the filler are configured to encapsulate the portion of at most four fasteners.

In addition to one or more of the features described above, or as an alternative, further embodiments of the method may include that the housing is configured to reduce drag of the stator assembly.

In addition to one or more of the features described above, or as an alternative, further embodiments of the method may include that the cover portion of the housing includes a first side opening and a second side opening.

According to another embodiment, a fastener retention mechanism housing for a stator assembly is provided. The fastener retention mechanism housing for a stator assembly having: a base; a pair of opposing side walls extending from the base; and a cover portion extending between the pair of opposing side walls. The base includes a first through hole, a second through hole, a third through hole, and a fourth through hole. The cover portion includes a first fastener access opening and a second fastener access opening. The first fastener access opening being opposite the first through hole and the second through hole. The second fastener access opening being opposite the third through hole and the fourth through hole.

In addition to one or more of the features described above, or as an alternative, further embodiments of the fastener retention mechanism housing may include a screen, the screen configured to cover the at least one fastener access opening.

In addition to one or more of the features described above, or as an alternative, further embodiments may include that the cover portion of the housing includes a first side opening and a second side opening.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
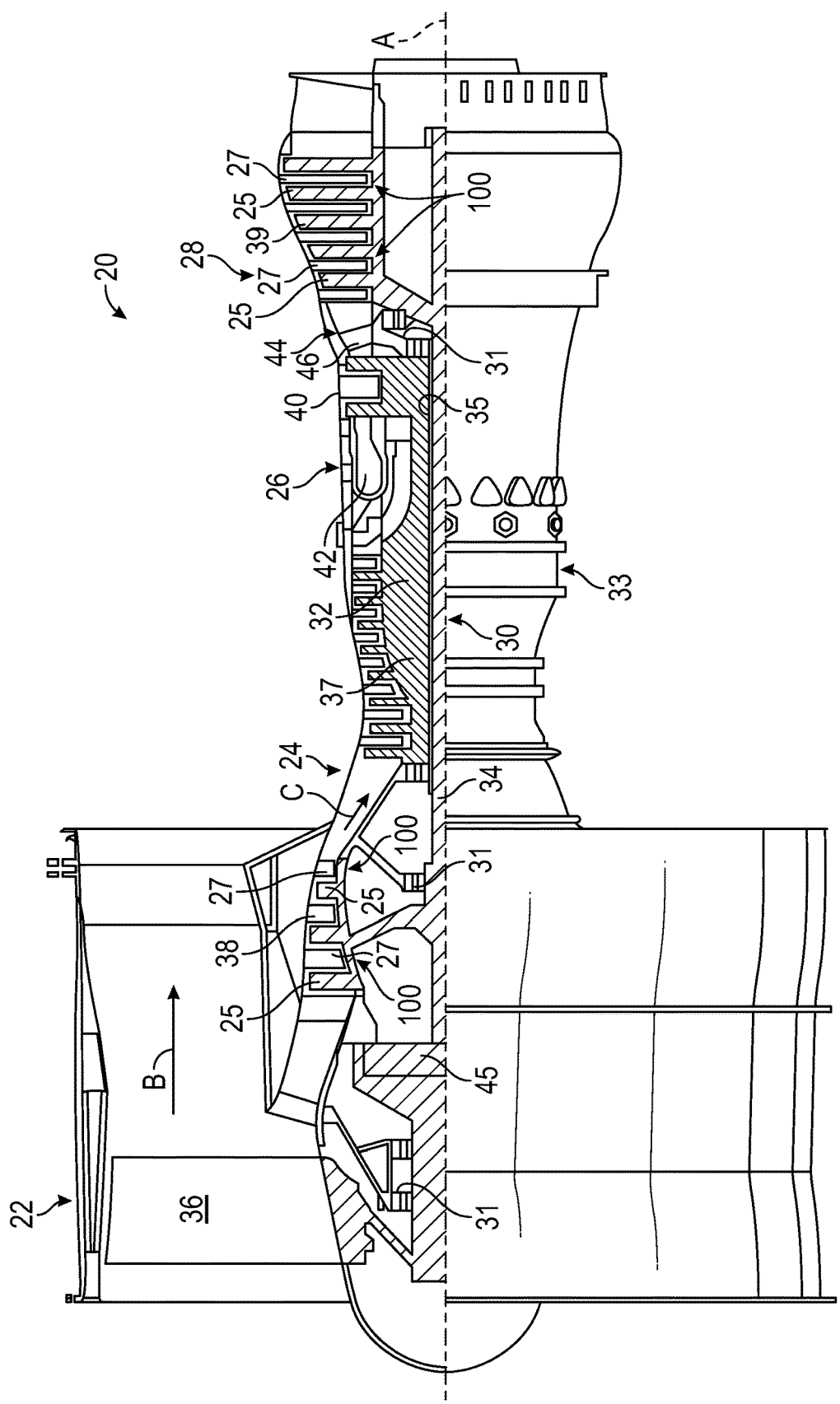
FIG. 1 is a schematic cross-sectional illustration of an embodiment of a gas turbine engine that may employ various embodiments disclosed herein.

FIG. 1 schematically illustrates an embodiment of a gas turbine engine 20 that may employ various embodiments disclosed herein. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a two-spool turbofan gas turbine engine in the disclosed non-limiting embodiment, it should be understood that the concepts described herein are not limited to two-spool turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. The engine 20 in one non-limiting example is a high-bypass geared aircraft engine. In a further example, the engine 20 bypass ratio is greater than about six (6), with an example embodiment being greater than about ten (10), the geared architecture 45 is an epicyclic gear train, such as a planetary gear system or other gear system, with a gear reduction ratio of greater than about 2.3 and the low pressure turbine 39 has a pressure ratio that is greater than about five. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). The geared architecture 45 may be an epicycle gear train, such as a planetary gear system or other gear system, with a gear reduction ratio of greater than about 2.3:1. It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of [(Tram ° R)/(518.7° R)]10.5, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and stator assemblies 100 that carry airfoils that extend into the core flow path C. For example, the rotor assemblies can carry a plurality of rotating blades 25, while each stator assembly 100 can carry a plurality of guide vanes 27 that extend into the core flow path C. The blades 25 of the rotor assemblies create or extract energy (in the form of pressure) from the core airflow that is communicated through the gas turbine engine 20 along the core flow path C. The guide vanes 27 of the stator assemblies 100 direct the core airflow to the blades 25 to either add or extract energy.

Various components of a gas turbine engine 20, including but not limited to the airfoils of the blades 25 and the guide vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation.

Figure 2:
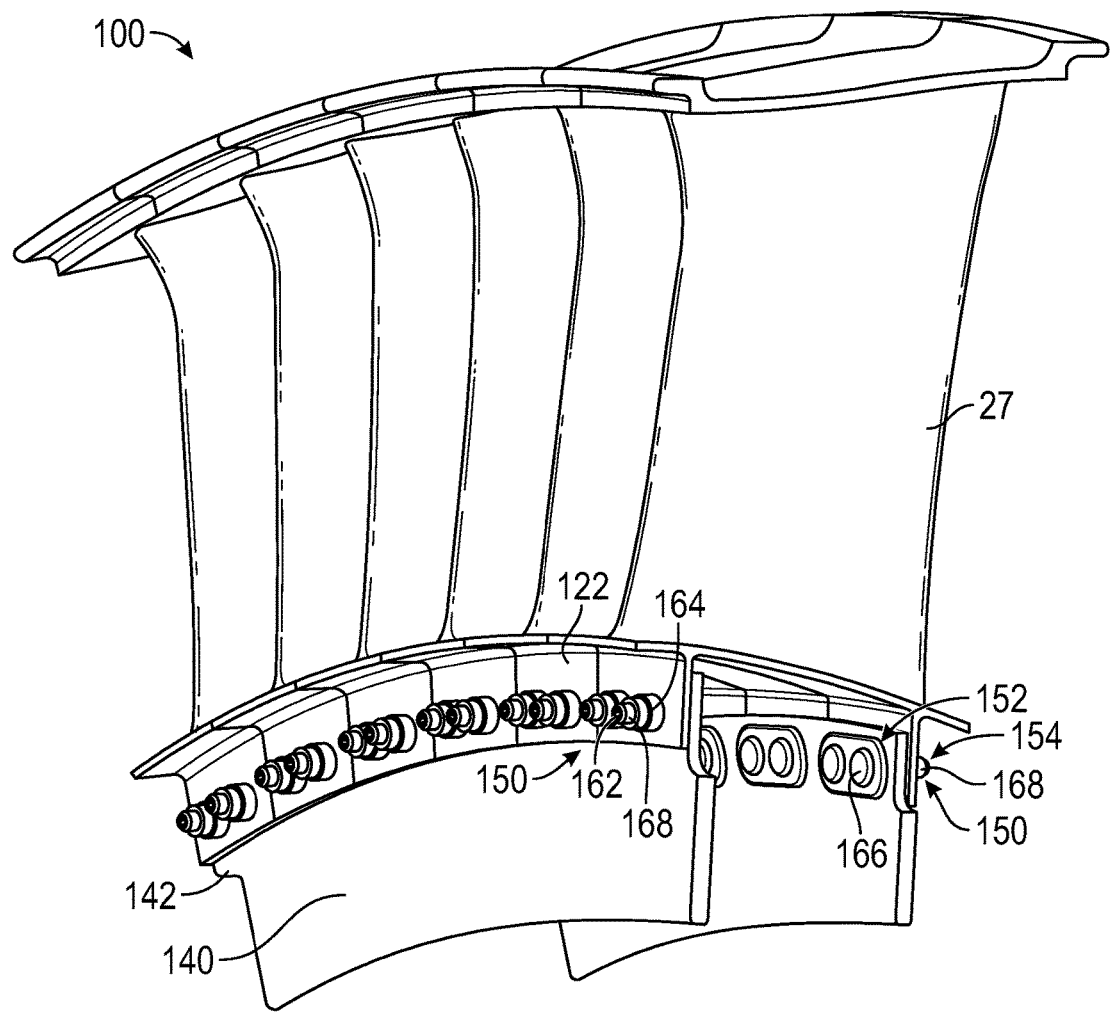
FIG. 2 is a perspective view of stator assembly without a fastener retention mechanism, according to various embodiments of the present disclosure.

FIG. 2 shows a perspective view of stator assembly 100 without a fastener retention mechanism, according to embodiments of the present disclosure. The stator assembly 100 comprises an inner air seal carrier 140 comprising a mounting body 142 for securing to an end 122 of each of a plurality of guide vanes 27. The stator assembly 100 further comprises a plurality of fasteners 150 to secure each of the plurality of guide vanes 27 to the mounting body 142. The fasteners 150 have a first end 152 and a second end 154. In the illustrated embodiment, the fasteners 150 each comprise a nut 164 and a bolt 162, as seen in FIG. 2. The bolt 162 has a head 166 at the first end 152 of the fastener 150 and a threaded portion 168 at the second end 154 of the fastener 150. The nut 164 is secured to the bolt 162 at the threaded end 168. In one implementation the nut 164 and bolt 162 may be self-locking. In another implementation, the bolt 162 may be a HI-LOK threaded pin and the nut 164 may be a threaded collar with a removable wrenching element that breaks off at a selected torque during installation. As mentioned above, secondary sources of retention of the fasteners or the fasteners themselves may create unwanted drag in the engine 20. Moreover, should portions of the fasteners or the nuts themselves become dislodged during operation of the engine 20 it is undesirable to have them passing though the engine 20.

Figure 3:
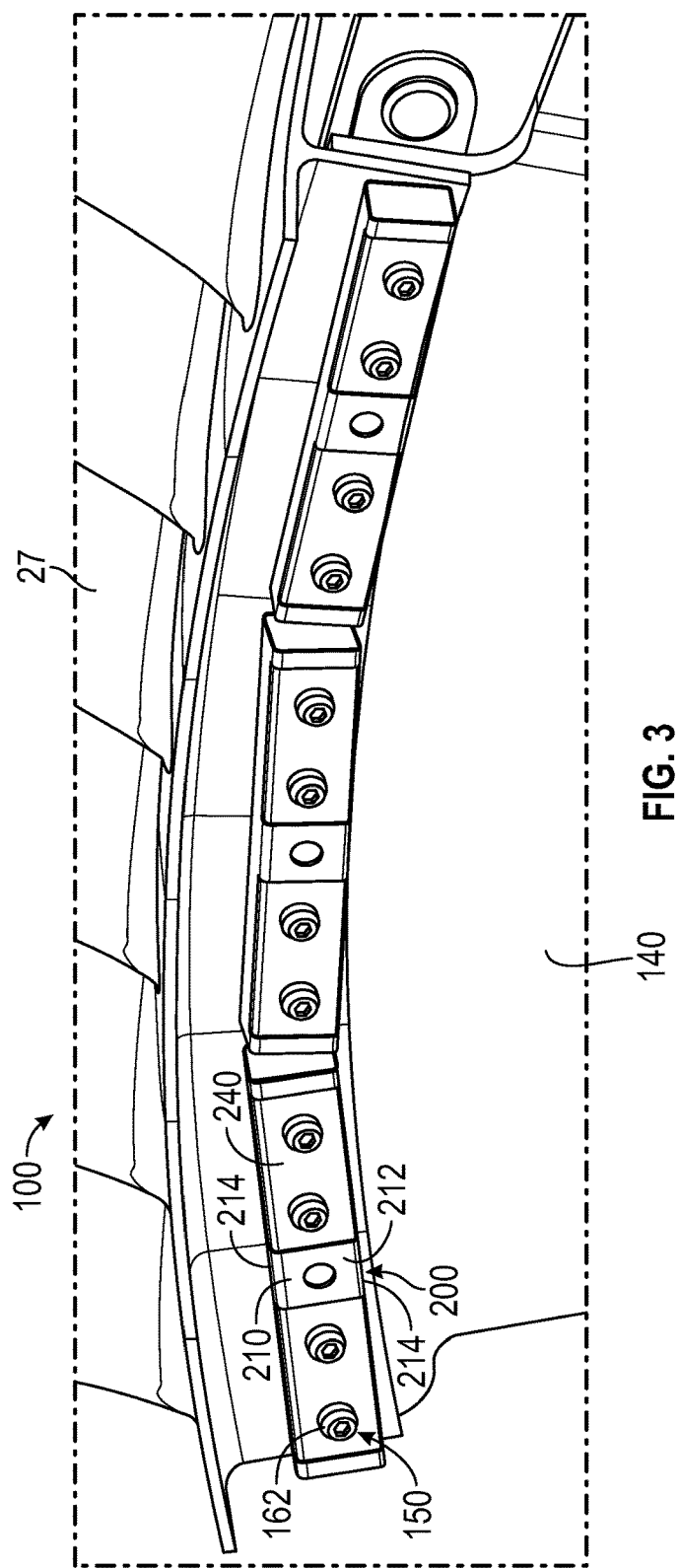
FIG. 3 is a perspective view of a stator assembly with a fastener retention mechanism, according to an embodiment of the present disclosure.

Referring now to FIGS. 3-7 various embodiments of the present disclosure are provided. FIG. 3 shows a stator assembly 100 with a fastener retention mechanism 200, according to an embodiment of the present disclosure. As used herein the fastener retention mechanism of the stator assembly 100 may also be fastener retention mechanism 200 of FIGS. 3-6, fastener retention mechanism 300 of FIG. 6, or fastener retention mechanism 400 of FIG. 7.

Figure 4:
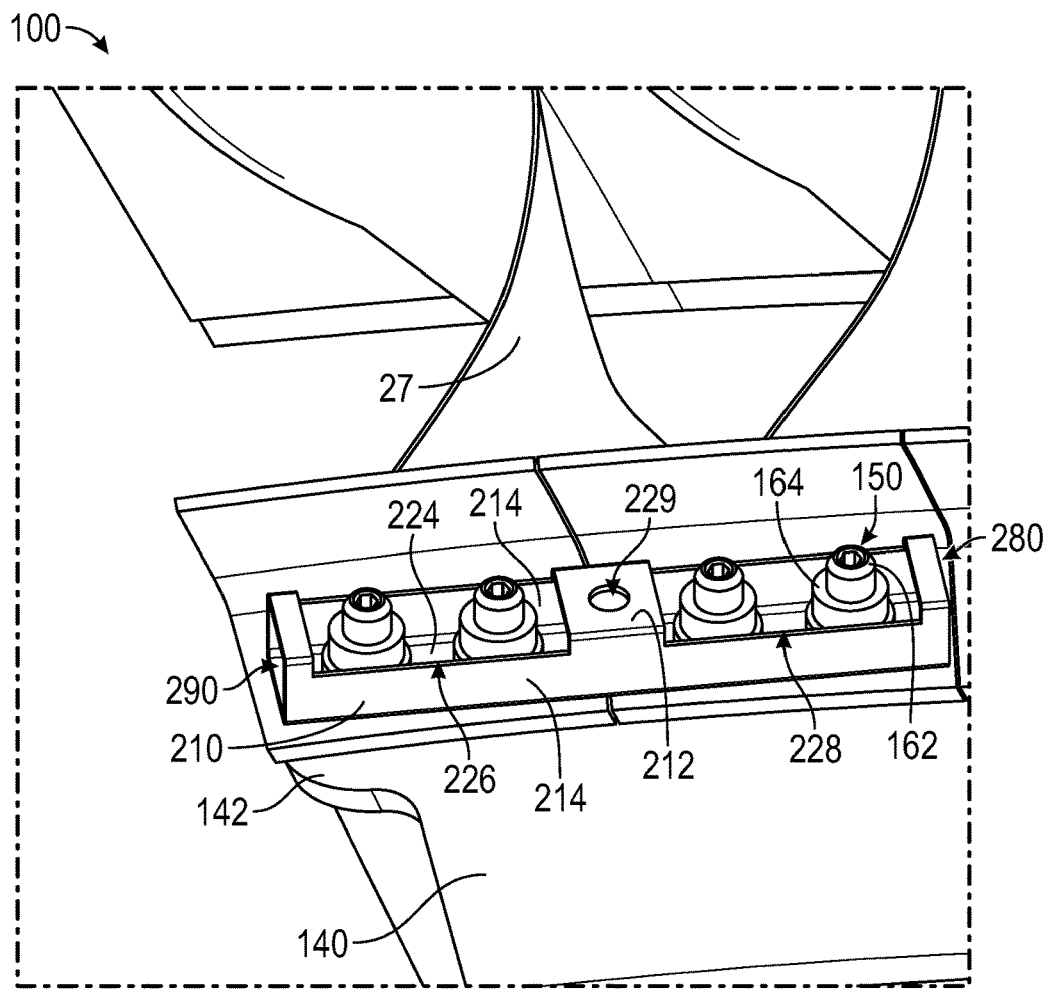
FIG. 4 is an enlarged perspective view of a housing of the fastener retention mechanism within the stator assembly of FIG. 3, according to an embodiment of the present disclosure.
Figure 5:
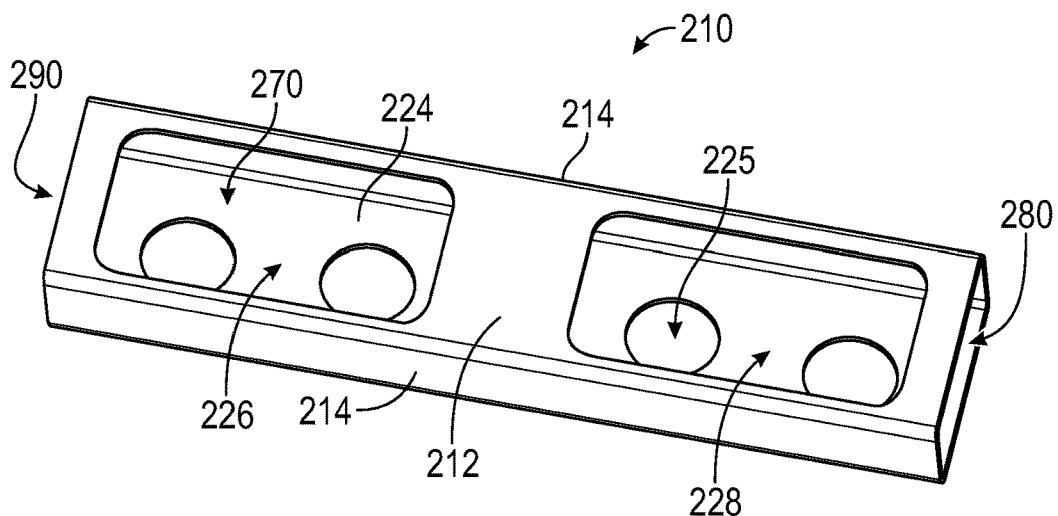
FIG. 5 is an enlarged perspective view of the housing of FIG. 4, according to an embodiment of the present disclosure.
Figure 6:
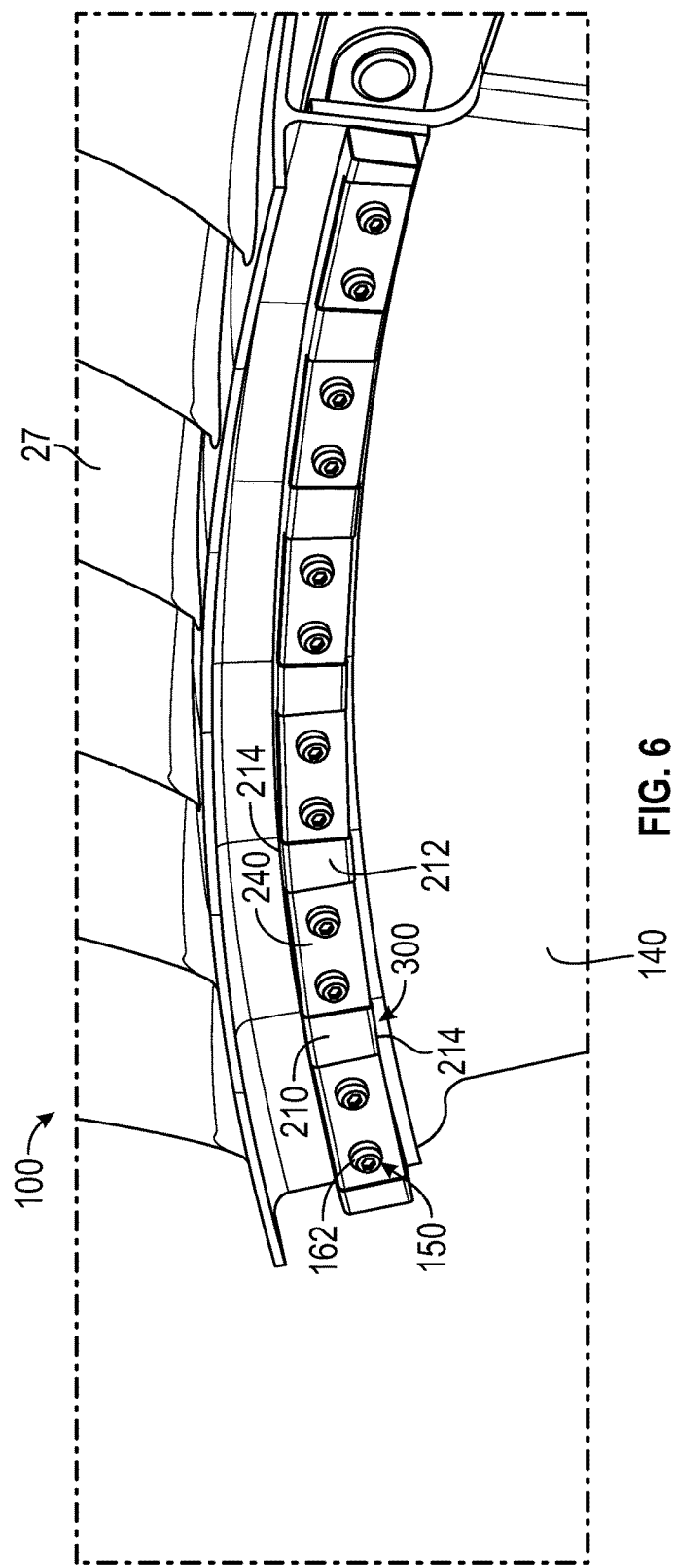
FIG. 6 is a perspective view of a stator assembly with a fastener retention mechanism, according to an embodiment of the present disclosure.

The fastener retention mechanism 200 provides several useful features in that it encases or retains the fasteners 150 of the stator assembly 100 in an inner chamber 270 of a housing 210. The housing 210 having a bottom part or base 224, a pair of opposing side walls 214 extending from the base, and a top or cover portion 212 extending between the pair of opposing side walls 214. The base 224 is configured to secure to the mounting body 142. As illustrated the housing 210 defines the inner chamber 270, as seen in FIGS. 4 and 5. The inner chamber 270 is injected (i.e. filled) with a filler 240 to encapsulate nuts 164 within the filler 240, such that should portions of the fasteners 150 or the nuts 164 themselves become dislodged, they will be retained by the filler 240 of the fastener retention mechanism 200 so that no further damage may occur. The filler 240 may be, but is not limited to rubber, silicone, or any other similar substance known to one of skill in the art.

In addition, the fastener retention mechanism 200 also provides a low profile or smooth surface that does not adversely affect air flow through the engine while also providing a secondary source of retention for the fasteners 150. As may be appreciated by one of skill in the art, multiple stator assemblies 100 are assembled together in a ring to form a complete circle of guide vanes 27 for installation into the gas turbine engine. Likewise, fastener retention mechanisms 200 are assembled proximate to each other in a ring to form a complete circle, a portion of which may be seen in FIG. 3. Alternatively, a single fastener retention mechanism such as fastener retention mechanism 300 or fastener retention mechanism 400 may be used to form a portion of a complete circle, which may be seen in FIG. 7 or 8, respectively. In a non-limiting embodiment, a fastener retention mechanism may form a complete circle.

As shown in the illustrated embodiment of FIG. 4, the housing 210 may be secured at the base 224 of the housing 210 to the stator assembly 100 proximate to the mounting body 142 and the ends 122 of the guide vanes 27 by the fasteners 150. In order to secure the housing 224 to the stator assembly 100, the base 224 has a plurality of through holes 225 configured to be aligned with a plurality of mounting holes in the mounting body 142 and a plurality of retention holes in the vanes 27 such that the fasteners 150 can be inserted through the retention holes of the vanes 27, the mounting holes of the mounting body 142 and the through holes 225 of the base 224 so that the housing 224 and vanes 27 can be simultaneously secured to the stator assembly 100. In an embodiment, the base 224 may have at most four through holes 225, as seen in FIG. 5.

For example, bolt 162 of each one of the fasteners 150 is inserted through all three holes simultaneously and then the corresponding nut 164 of each one of the fasteners 150 is threaded onto the threaded portion of the bolt 162 that extends past the base 224 of the housing 210. The diameter of the nut 164 is greater that the diameter of the through hole 225 in the base 224 of the housing 210 such that when tightened, the nut 164 secures the housing 210, the mounting body 142 of the inner air seal carrier 140, and the guide vanes 27 together, as shown in FIG. 4. In addition, the head 166 of the bolt is greater than any opening the bolt 162 passes through. As illustrated and when the housing 210 is secured to the stator assembly 100, the nut 164 and the portion of the bolt 162 extending past the base 224 of the housing 210 are located between in the inner chamber 270. The nut 164 is located completely within the inner chamber 270, while a portion threaded end of the bolt 162 may extend beyond the cover portion 212 and outside of the inner chamber 270. This allows the nuts 164 to be enclosed within the housing 210, and also encapsulated by the filler 240 when injected into the inner chamber 270. The filler 240 will encapsulate a portion of the fastener 150 in the inner chamber 270. As mentioned above, the filler 240 will capture the portion of the fasteners encapsulated that may become dislodged and the cover portion 212 has a low profile or smooth surface that minimizes drag on the stator assembly 100 attributable to the fasteners 150. As illustrated, the housing 210 is an elongated member configured to encase portions of a plurality of fasteners 150 therebetween.

Figure 7:
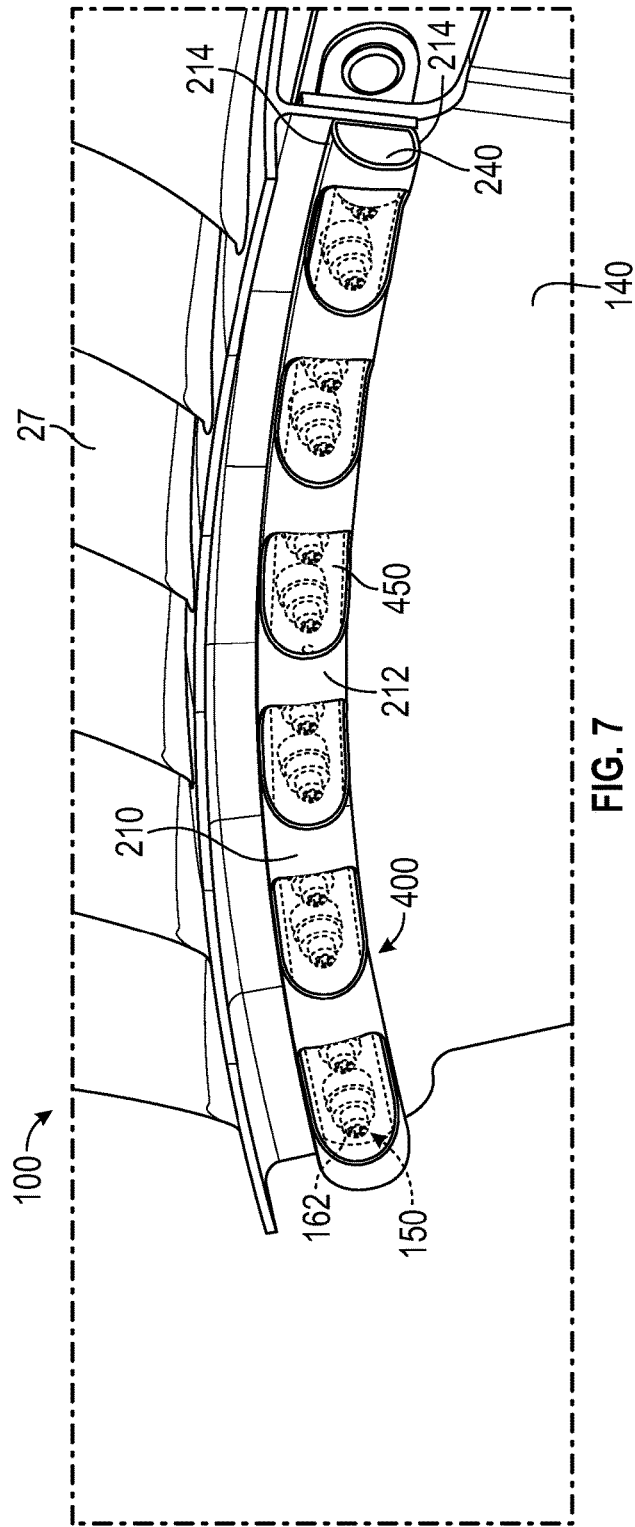
FIG. 7 is a perspective view of a stator assembly with a fastener retention mechanism, according to an embodiment of the present disclosure.

In FIG. 5, the housing 210 is illustrated as having a rectangular cross-section or profile with a straight shape however it is, of course, understood that various configurations, geometries, sizes, shapes, etc. may be used for housing 210 without departing from the scope of the present disclosure. For example, a cover portion 212 with a U shaped cross-section or profile and arcuate shape may be used, as illustrated in the fastener retention mechanism 400 of FIG. 7. Further and as seen in FIG. 7, the shape of the filler 240 will match the shape of the housing 210, as the filler 240 is injected into the inner chamber 270 as a liquid and then solidifies. The filler 240 may be formed from a liquid material that is converted into a solid elastically deformable material having resilient properties. In one embodiment, the housing 210 is illustrated as having a rectangular cross-section or profile with an arcuate shape, see for example the fastener retention mechanism 300 of FIG. 6. In another embodiment, the housing 210 may be composed of a light weight material, such as for example, thin metal sheet, bar stock, composite laminate or any other type of suitable light weight material known to one of ordinary skill in the art. In yet another embodiment, the cover portion 212 may include additional holes 229 to reduce its weight.

In the illustrated embodiment, the cover portion 212 of the housing 210 includes a first fastener access opening 226 and a second fastener access opening 228. The fastener access opening serves two primary purposes, the first of which is to allow an opening for the nut 164 to be tightened during assembly. The second purpose is to provide clearance for the bolt 162 to stick out of the housing 210 as required. Alternatively, the bolt 162 may be enclosed within the inner chamber 270, as seen in FIG. 7. Further, the housing 210 may include a screen 450 to cover at least one of the fastener access openings, as seen in FIG. 7. The screen 450 provides additional aerodynamic benefits by fully enclosing the bolts 162. The screen 450 may be inserted into the inner chamber 270 of the housing after the fasteners are secured. The screen 450 may be inserted from either a first side opening 290 or a second side opening 280. If the screen 450 is present, the filler may have to be injected from either the first side opening 290 or the second side opening 280, because the fastener access openings 226 and 228 will be covered. In FIGS. 4 and 5, the first fastener access openings 226 and the second fastener access opening 228 are illustrated as having a rectangular profile providing access to two bolts 164; however it is, of course, understood that various configurations, geometries, sizes, shapes, etc. may be used for providing access without departing from the scope of the present disclosure. For example, the fastener access openings may have a rounded shape, as shown in FIG. 7.

In the illustrated embodiment, the cover portion 212 of the housing 210 includes the first side opening 290 and the second side opening 280, which help to save weight by reducing the material required for the cover portion 212. The side openings also allow the filler 240 to expand and contract with the temperature changes of the gas turbine engine. If the cover portion 212 does include a first side opening 290 and/or a second side opening 280, the side openings will have to be covered during the injection process so that the filler 240 does not leak out the side openings prior to hardening.

Figure 8:
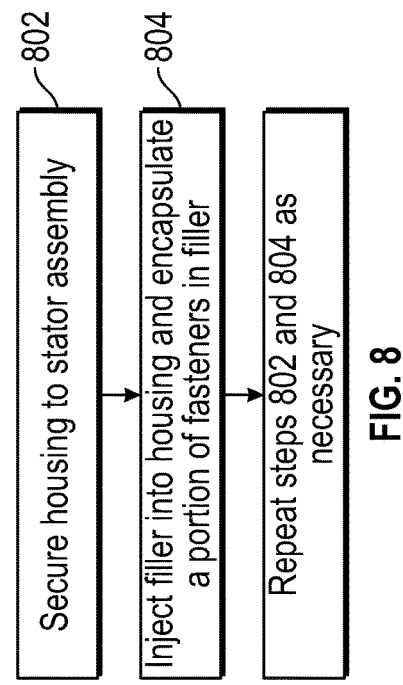
FIG. 8 is a flow chart illustrating a method of securing a fastener retention mechanism to a stator assembly according to various embodiments of the present disclosure.

Referring now to FIG. 8, a flow chart illustrating a method 800 for assembling a stator assembly 100 in accordance with one non-limiting embodiment of the present disclosure is shown. At block 802, a housing 210, is secured to an air seal carrier 140 of at least one guide vane 27 with a plurality of fasteners 150. In a non-limiting embodiment, the fasteners may comprise bolts 162 and complimentary nuts 164. The housing 210 defines an inner chamber. At block 804, a filler 240 is injected into the inner chamber 270. The filler 240 being configured to encapsulate a portion of the fasteners. In a non-limiting embodiment, the nuts 164 may be encapsulated by the filler 240. The filler 240 will flow into the inner chamber 270 and then harden. The filler 240 may harden on its own or through a curing process. If the cover portion 212 includes a first side opening 290 and/or a second side opening 280, the side openings may need to be covered during the injection process so that the filler 240 does not leak out the side openings prior to hardening. Thereafter, steps 802 and 804 (if necessary) are repeated until the desired amount of fastener retention mechanisms are secured to the stator assembly 100.

While the above description has described the flow process of FIG. 8 in a particular order, it should be appreciated that unless otherwise specifically required in the attached claims that the ordering of the steps may be varied.

Advantageously, a fastener retention mechanism as provided herein may enable retention and/or capture of fasteners that may become loose/and or broken, thus preventing entry into the rotating components of the gas turbine engine. Further advantageously, embodiments provided herein may enable drag reduction for the stator assembly by encasing the fasteners in the fastener retention mechanism. Also advantageously a housing as provided herein may enable increased protection of the filler from gas turbine engine air and/or help prevent the filler from cracking, thus preventing entry of filler fragments into the rotating components of the gas turbine engine. Also, advantageously a housing and filler sized to enclose at most four bolts as provided hearing may enable expansion and/or contractions of the filler due to heat from the gas turbine engine, thus helping to prevent cracking.

Technical effects of embodiments of the present disclosure include a fastener retention mechanism to retain and/or capture fasteners that may become loose and/or broken. Further technical effects may include reduced risk of loosened and/or broken fasteners impacting rotating components of the gas turbine engine. Further technical affects may include reduced drag around fasteners by encasing the fasteners in the fastener retention mechanism. Further technical affects may include reduced exposure of the filler to gas turbine engine air by encasing the filler in the housing. Further technical effects may include a reduced risk of cracked and/or loosened filler fragments impacting rotating components of the gas turbine engine.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A stator assembly for a gas turbine engine, the stator assembly comprising:
    an inner air seal carrier having a mounting body;
    a plurality of guide vanes secured to the mounting body via a plurality of fasteners; and
    a fastener retention mechanism secured to the mounting body via the plurality of fasteners, the fastener retention mechanism comprising:
        a housing defining an inner chamber;
        a filler located within the inner chamber; and
        wherein portions of the plurality of fasteners are encapsulated within the filler,
    wherein the housing further comprises: a base configured to secure to the mounting body; and a pair of opposing side walls extending from the base and a cover portion extending between the pair of opposing side walls, and
    wherein the housing includes a screen located in the inner chamber, the screen configured to cover the at least one fastener access opening.

2. The stator assembly of claim 1, wherein the cover portion includes at least one fastener access opening.

3. The stator assembly of claim 1, wherein the filler is formed from a liquid material that is converted into a solid elastically deformable material having resilient properties.

4. The stator assembly of claim 1, wherein the housing and the filler are configured to encapsulate the portion of at most four fasteners.

5. The stator assembly of claim 1, wherein the housing is configured to reduce drag of the stator assembly.

6. The stator assembly of claim 1, wherein the cover portion of the housing includes a first side opening and a second side opening.

7. A method for encasing a portion of a plurality of fasteners securing a plurality of guide vanes to a mounting body of an inner air seal carrier, comprising:
    securing the plurality of guide vanes to the mounting body via the plurality of fasteners;
    simultaneously securing a housing of a fastener retention mechanism to the mounting body via the plurality of fasteners, the housing defining an inner chamber and wherein the portion of the fasteners are located in the inner chamber; and
    injecting a filler into the inner chamber, the filler configured to encapsulate the portion of the fasteners,
    wherein the housing further comprises: a base configured to secure to the mounting body; and a pair of opposing side walls extending from the base and a cover portion extending between the pair of opposing side walls, and
    wherein the housing includes a screen located in the inner chamber, the screen configured to cover the at least one fastener access opening.

8. The method of claim 7, wherein the cover portion includes at least one fastener access opening.

9. The method of claim 7, wherein the filler is formed from a liquid material that is converted into a solid elastically deformable material having resilient properties.

10. The method of claim 7, wherein the housing and the filler are configured to encapsulate the portion of at most four fasteners.

11. The method of claim 7, wherein the housing is configured to reduce drag of the stator assembly.

12. The method of claim 7, wherein the cover portion of the housing includes a first side opening and a second side opening.

13. A fastener retention mechanism housing for a stator assembly of a gas turbine engine, the fastener retention mechanism housing comprising:
    a base;
    a pair of opposing side walls extending from the base; and
    a cover portion extending between the pair of opposing side walls,
    wherein the base includes a through hole configured to receive a fastener to secure the housing to the stator assembly of the gas turbine engine, and
    wherein the cover portion includes a fastener access opening, the fastener access opening being opposite the through hole; and
    a screen configured to cover the fastener access opening.

14. The fastener retention mechanism housing of claim 13, wherein the cover portion of the housing includes a first side opening and a second side opening.

\* \* \* \* \*